Oct. 25, 1966   A. H. WIEBE   3,281,163
TOWING HITCH
Filed Oct. 9, 1964
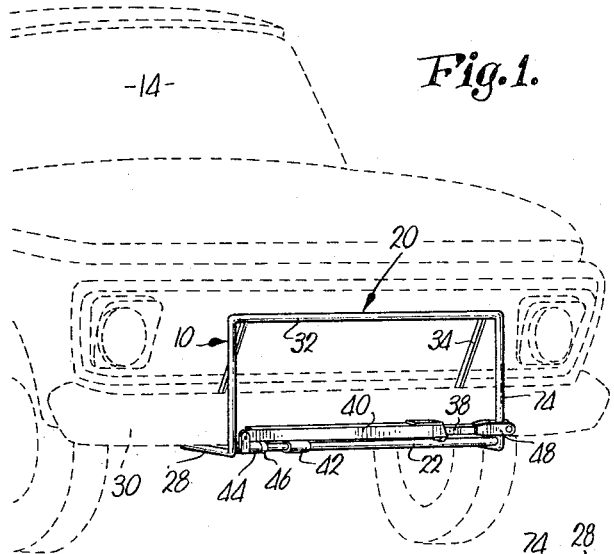
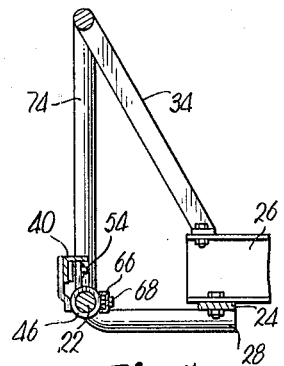
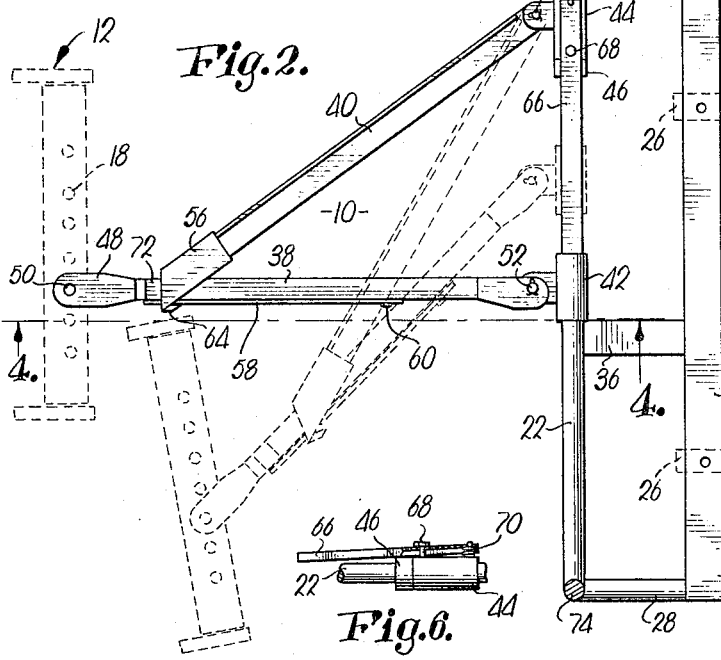
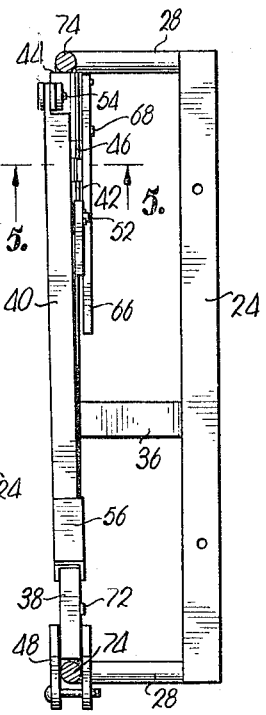
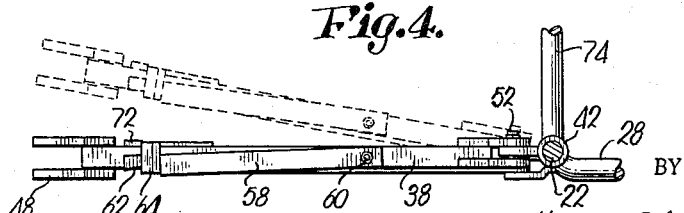
INVENTOR.
Arthur H. Wiebe
BY
Hovey, Schmidt, Johnson & Hovey
ATTORNEYS.

3,281,163
Patented Oct. 25, 1966

3,281,163
TOWING HITCH

Arthur H. Wiebe, 1606 N. 7th, Garden City, Kans.

Filed Oct. 9, 1964, Ser. No. 402,757
3 Claims. (Cl. 280—491)

This invention relates to an assembly adapted to be placed into interconnecting relationship to a towing medium and a unit to be towed, the primary object being to provide an arrangement which will obviate the difficulties normally encountered by the user in connecting the towing medium with such assembly prior to commencement of the towing operation.

Those skilled in this field are quite aware of the difficulties encountered when, for example, a tractor is to be maneuvered into position where its drawbar or the like must be properly aligned with the clevis of a hitch so that the clevis pin can be dropped into place through one of the openings normally provided in the drawbar. It is usually necessary, except in a two man operation, for the tractor operator to dismount several times before he is finally able to make the necessary connection. Most tractors today are not constructed in a manner to permit operation from the ground; furthermore, in instances wherein such is possible, the practice is much too dangerous to be recommended.

Therefore, as above indicated, the most important object of the present invention is the provision of a towing hitch which has a tow bar that can be shifted throughout a rather wide range of positions, permitting attachment to the tractor even though the latter is not properly aligned with the unit to be towed, with the entire towing hitch assembly made and constructed in a manner to cause the tow bar to automatically align itself with the normal path of travel of the tractor and the unit to be towed immediately upon commencement of the towing operation.

Another important object of the present invention is to provide releasable latching and locking arrangements which become automatically operable to hold the tow bar in proper relationship to the towing medium and the towed unit after the aforementioned alignment has been established by virtue of the initial forward movement in the towing operation.

Still another important object of the present invention is the provision of a towing hitch which may be universally mounted on a number of different types of units to be towed and which includes a novel arrangement permitting the collapsing of certain of the parts into a condensed package when not in use.

In the drawing:

FIGURE 1 is a perspective view of a towing hitch made pursuant to the teachings of my present invention illustrated in place on a unit to be towed with certain parts in their collapsed, stored position;

FIG. 2 is an enlarged plan view of the hitch with a portion only of the towing medium and the towed unit illustrated in phantom and showing also by dashed lines one position of certain parts, unaligned and prior to commencement of the towing operation;

FIG. 3 is a plan view of the hitch entirely disassociated from the towing medium and the towed unit with the above mentioned parts collapsed;

FIG. 4 is a fragmentary cross-sectional view taken along line 4—4 of FIG. 2 illustrating also the vertical swinging movement of the tow bar with respect to its supporting framework;

FIG. 5 is a fragmentary detailed cross-sectional view taken along line 5—5 of FIG. 3; and FIG. 6 is a detailed, fragmentary inside elevational view of a releasable lock forming a part of the hitch.

The towing hitch illustrated by the drawing and broadly designated by the numeral 10 is adapted to interconnect a towing medium 12 and a unit 14 to be towed. For purposes of illustration the unit shown in phantom in FIG. 1 may be an automobile, such as a pickup truck, and the towing medium 12, may be any conventional tractor, shown only fragmentarily in FIG. 2, that is to say one type of tractor drawbar 16 having one or more vertical openings 18.

It is contemplated that the entire hitch 10 be supported by the unit 14 and to this end there is provided a suitable framework 20 that includes an elongated rod 22 disposed horizontally in front of the unit 14 transversely to its normal path of travel. The rod 22 may be mounted on the unit 14 through the use of an elongated frame piece 24 secured to chassis 26 of unit 14 and connected with the rod 22 by arms 28 extending forwardly therefrom and thence upwardly in front of bumper 30 into a guard 32, the latter of which may in turn be reinforced by inclined bases 34 releasably attached to the chassis 26. A strap 36 between rod 22 and frame piece 24 serves also to reinforce the rod 22 intermediate its ends.

A tow bar 38 is connected to the rod 22 and a stabilizer bar 40 interconnects the tow bar 38 and the rod 22.

A member 42 in the nature of a sleeve is rotatably mounted on the rod 22 for reciprocation toward and away from the strap 36. An element 44, spaced from the strap 36, is likewise rotatable on the rod 22 but held against reciprocation therealong by a collar 46 rigid to the rod 22 holding the tubular element 44 adjacent the proximal arm 28, it being seen, therefore, that the sleeve 42 reciprocates between the strap 36 and the collar 46, both of which serve as stops to limit the extent of reciprocable movement of the sleeve 42.

One end of the tow bar 38 is provided with a clevis 48 which receives pivotal attaching means 50 in the nature of a pin passing through one of the openings 18, permitting horizontal swinging movement of the tow bar 38.

Pivotal connecting means in the form of a pin 52 likewise provides for such horizontal swinging movement of the tow bar 38 and serves to connect the opposite end of the tow bar 38 with the sleeve 42.

The stabilizer bar 40 is also horizontally swingable, and this is accomplished by pivotal joining structure such as a pin 54 at one end of the stabilizer bar 40 joining the same with the tube 44. The opposite end of the stabilizer bar 40 is provided with reciprocable coupling means permitting it to shift along the tow bar 38. Such coupling consists of a loop device 56 which rather loosely surrounds the tow bar 38.

A releasable latch in the nature of an elongated plate 58 is vertically swingable on the tow bar 38 through the medium of a pivot pin 60. One end of the plate 58 remote from pivot pin 60 has a notch 62 normally receiving a portion 64 of the loop 56, the latter of which also surrounds the plate 58.

A releasable lock in the nature of an elongated device 66 is attached intermediate its ends to the tube 44 by a fastener 68. A spring 70 between the tube 44 and one end of the device 66 yieldably biases the opposite end of the device 66 toward the rod 22.

Assuming the clevis 48 to have been connected with the drawbar 16 by use of the pin 50 in the position illustrated by dotted lines in FIG. 2, forward movement of the tractor 12 in commencement of the towing operation will cause the tow bar 38 to swing toward the full line position of FIG. 2 about the pivot pin 52. At the same time, the sleeve 42 shifts along rod 22 toward and into engagement with the stop 36. Simultaneously, the loop 56 of the stabilizer bar 40 will shift along the tow bar 38 toward the clevis 48 as the stabilizer bar 40 swings about the pivot pin 54. When the loop 56 reaches the position shown by full lines in FIG. 4, the latch 58 will gravitate to the position illustrated behind the loop 64, that is to say, the notch 62 receiving the loop 56 will automatically prevent the latter from shifting toward the pivot pin 52 during the towing operation.

The lock 66 also automatically comes into play to prevent movement of the sleeve 42 toward the stop 46 during the towing operation. This is effected by virtue of the sleeve 42 shifting out from beneath the device 66 so that in its operating position sleeve 42 is held between the stop 36 and the proximal free end of the device 66. A stop 72 on the tow bar 38 limits the extent of outward movement of the loop 56 toward the clevis 48.

It can be appreciated from viewing FIG. 4 that by virtue of the rotatable connections of the sleeve 42 and the tube 44 with the rod 22, tow bar 38 and stabilizer bar 40 are free to swing vertically about the horizontal axis of rod 22, thereby accommodating for uneven terrain over which the tractor 12 and the unit 14 may be caused to travel during the towing operation.

After removal of the pivot pin 50, the tow bar 38 and the stabilizer bar 40 may be placed into the collapsed position illustrated in FIGS. 1, 3 and 5 by manual release of the latch 58 and the lock 66. This permits the folding operation by virtue of movement of the sleeve 42 toward the stop 46 and movement of the loop 56 toward the pivot pin 52.

The sleeve 42 and the tube 44 may then be slightly rotated on the rod 22, placing the tow bar 38 and stabilizer bar 40 in stacked relationship, with the tow bar 38 between rod 22 and stabilizer bar 40. The clevis 48 is then dropped into looped relationship to one of the uprights 74 of the guard 32.

Having thus described the invention, what is claimed as new and desired to be secured by Letters Patent is:

1. In a towing hitch:
   framework adapted for connection with a unit to be towed and including an elongated rod disposed horizontally and extending transversely to the path of travel of said unit;
   a tow bar having means at one end thereof adapted to be pivotally attached with a towing medium for horizontal swinging movement;
   a fastening member slidably carried by said rod for horizontal reciprocation along the rod toward and away from one end of the latter and laterally of the normal path of travel of said unit, said member being mounted on said rod for pivoting movement about the longitudinal axis of the rod;
   means pivotally connecting the opposite end of said tow bar with said member for swinging movement with respect to the latter and about an axis normal to said longitudinal axis of the rod;
   an elongated, rigid stabilizer bar;
   structure joining one end of the stabilizer bar with the rod at said one end of the latter for pivoting about the longitudinal axis of the rod and about an axis normal to said longitudinal axis; and
   means coupling the opposite end of the stabilizer bar with the tow bar, said coupling means being slidable on the tow bar for reciprocable movement therealong.

2. The invention of claim 1, and a releasable latch mounted on the tow bar in disposition to engage the coupling means when said opposite end of the stabilizer bar is adjacent said one end of the tow bar and operable to automatically lock said opposite end of the stabilizer bar against movement toward said opposite end of the tow bar.

3. The invention of claim 1, said tow bar being swingable to a collapsed position alongside the framework about said pivotal connecting means as said opposite end of the stabilizer bar moves toward said opposite end of the tow bar, said member and said structure being rotatable about the longitudinal axis of the rod when the tow bar is in said collapsed position to place the stabilizer bar and the tow bar in vertically stacked relationship; a stop on the rod for limiting the extent of movement of the member in one direction along the rod; and a releasable lock carried by the framework and engageable with the member for holding the member against movement in the opposite direction along the rod.

References Cited by the Examiner
UNITED STATES PATENTS

| | | | |
|---|---|---|---|
| 2,614,860 | 10/1952 | Samdahl | 280—491 X |
| 2,995,386 | 8/1961 | Peterson | 280—491 |
| 3,147,027 | 9/1964 | Bronleewe | 280—491 |

LEO FRIAGLIA, *Primary Examiner.*